May 20, 1952　　　　　　　J. D. PIRTLE　　　　　　2,597,814
ANIMAL TRAP
Filed May 12, 1949　　　　　　　　　　　　　2 SHEETS—SHEET 1
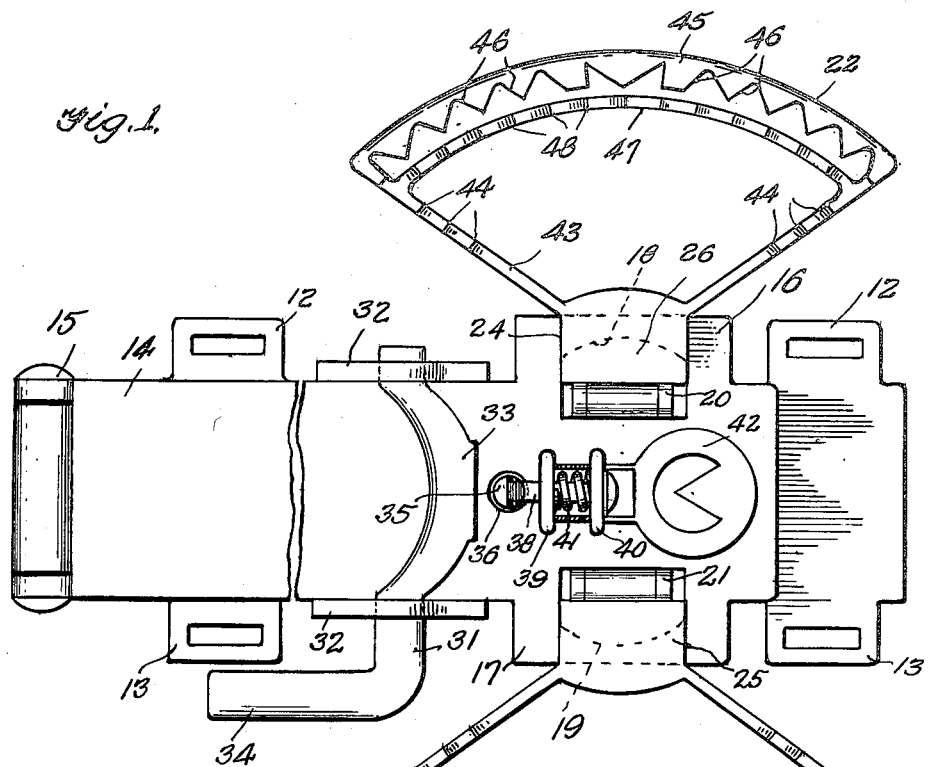
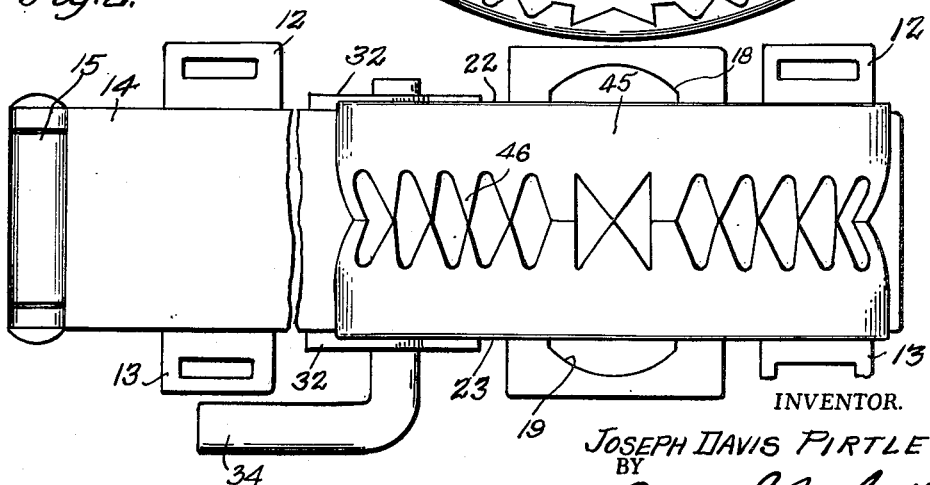
INVENTOR.
JOSEPH DAVIS PIRTLE
BY
Irving R. McCathran
HIS ATTY.

May 20, 1952   J. D. PIRTLE   2,597,814
ANIMAL TRAP
Filed May 12, 1949   2 SHEETS—SHEET 2
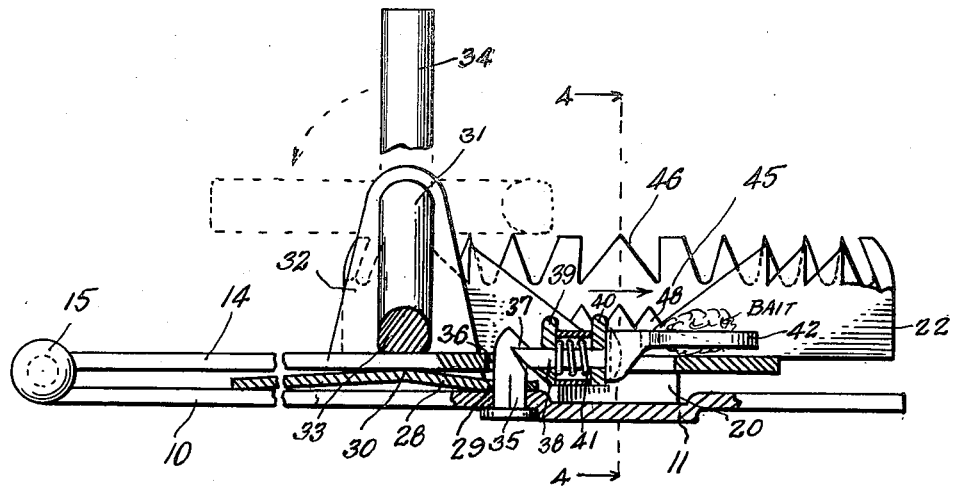
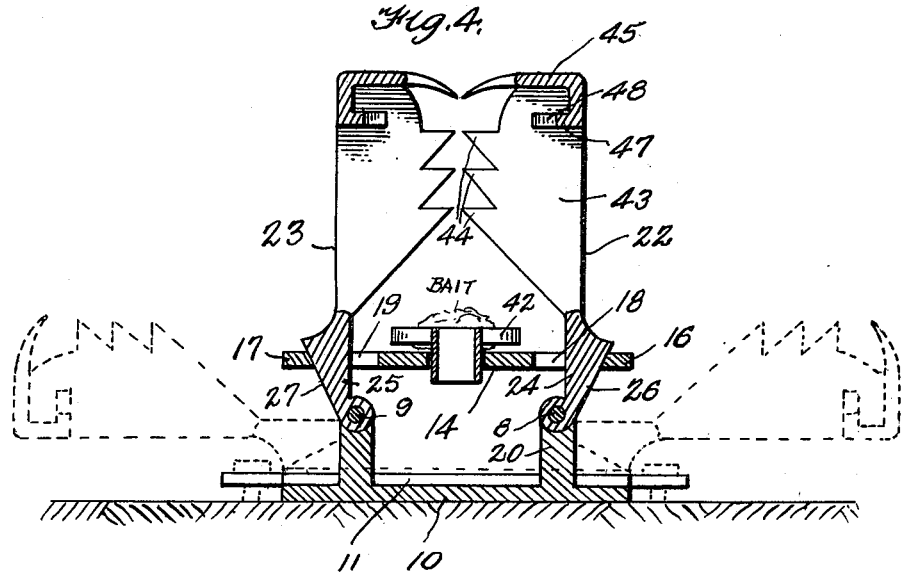
INVENTOR.
JOSEPH DAVIS PIRTLE
BY
Irving A. McCathran
HIS ATTY.

Patented May 20, 1952

2,597,814

UNITED STATES PATENT OFFICE 2,597,814

ANIMAL TRAP

Joseph Davis Pirtle, Siren, Wis.

Application May 12, 1949, Serial No. 92,790

2 Claims. (Cl. 43—92)

This invention relates to animal traps and has for one of its objects the production of a simple and efficient trap, wherein the jaws thereof will automatically open as the actuating plate is depressed, and wherein the trap will be held in a set position until sprung by an animal, thereby providing a desirable safety factor.

Other objects and advantages of this invention will appear throughout the following specification and claims.

In the drawings—

Figure 1 is a top plan view of the trap in an open position;

Figure 2 is a top plan view of a trap in a closed position;

Figure 3 is a central longitudinal sectional view of the trap in a set position;

Figure 4 is a vertical sectional view taken on line 4—4 of Figure 3 with the jaws shown in a closed position in full lines, and an open position in dotted lines.

By referring to the drawings, it will be seen that 10 designates the base or anchor plate which preferably is rectangular in shape and is provided with a depressed portion 11 intermediate its ends to accommodate the latching mechanism hereinafter described in detail. The base or anchor plate 10 is provided with laterally extending, longitudinally spaced, apertured ears 12 and 13 along opposite sides thereof to facilitate the anchoring of the trap in any desired or conventional manner.

An actuating plate 14 is hinged to one end of the base or anchor plate 10 by means of a suitable hinge connection 15, and this actuating plate 14 overlies the plate 10, as shown in the drawings. The opposite end of the plate 14 is free to swing upwardly when released, as hereinafter set forth. This actuating plate 14 is provided with laterally extending portions 16 and 17, which are provided with apertures 18 and 19 respectively. Upstanding journals 20 and 21 are carried by the base plate 10 and jaws 22 and 23 are hinged by hinge connections 8 and 9 to the journals 20 and 21 respectively. The jaws 22 and 23 are provided with lower shank portions 24 and 25 which extend through the respective apertures 18 and 19 when the jaws are in a closed position. The shank portions 24 and 25 are provided with upwardly and outwardly flared outer faces 26 and 27 thereby defining the shank portions 24 and 25 as downwardly inclined wedge-shaped in cross-section, as will be seen by considering Figure 4. The actuating plate 14, when the trap is set, is depressed to a position below the hinged connections 8 and 9, as shown in Figure 4, to cause the jaws 22 and 23 to automatically fall or swing outwardly to an open position. As the actuating plate 14 moves upwardly beyond the hinge connections 8 and 9, after the plate 14 is released, the jaws 22 and 23 will swing to a closed position due to the fact that the inclined outer faces 26 and 27 of the shank portions 24 and 25 will have contact with the sides of the apertures 18 and 19, thereby causing the jaws 22 and 23 to snap to a closed animal-engaging position. The apertures 18 and 19 are properly shaped to conform to the contour of the shank portions 24 and 25 so that a positive, sudden locking action will take place and thereby hold the jaws in a closed position after the trap has become sprung.

An actuating spring 28, preferably a flat spring, is secured as at 29, to the base or anchor plate 10 is any desired manner, such as welding or by any desired anchoring means. The opposite end of the spring 28 is free and the spring 28 preferably is bowed upwardly intermediate its ends, as at 30, where it contacts the under face of the actuating plate 14, as shown in Figure 3. It should be understood that any suitable type of spring may be used without departing from the spirit of the invention, which may properly operate the plate 14 when the plate 14 is released.

An actuating crank 31 is journaled upon the upstanding journals 32, which journals are carried upon opposite side edges of the base plate. This crank 31 is provided with a crank portion which contacts the upper face of the actuating plate 14 to depress the plate 14 to a latching or set position as the crank 31 is swung to the full line position shown in Figure 3. A handle 34 is carried by one end of the crank 31 and if desired a pipe or other tool may be used to fit over or engage the handle 34 to actuate the crank 31 when setting the trap and thereby avoid touching the trap with the hands and consequently avoid leaving a scent. After the trap is set the crank 31 is turned to the position shown in dotted lines in Figure 3 to hold the plate engaging portion 33 of the crank 31 out of contact with the actuating plate 14 and thereby permit the plate 14 to actuate without interference.

A trigger post 35 is carried by the base plate 10 and extends through a suitable aperture 36 in the actuating plate 14 when this plate 14 is in a set position. The post 35 is provided with a notch 37 which is adapted to receive the beveled end of the spring-pressed trigger pin 38. The trigger pin 38 is carried by the actuating plate 14 and is preferably square in cross-section and is slidably mounted through the guides 39 and 40 of the actuating plate. A coil spring 41 is secured at one end to the pin 38 and is located upon the pin 38 intermediate the guides 39 and 40 to yieldably mount the trigger pin 38 upon the actuating plate and to yieldably hold the pin 38 in locking engagement with the post 35. A bait-supporting member 42 is secured to the rear end of the trigger pin 38, and as an animal pulls upon the bait carried by the member 42, the trigger pin 38 will be pulled out of engagement with the post 35 against the tension of the coil spring 40. This action will release the actuating plate 14, and the force of the actuating spring 28 will swing the plate 14 upwardly, thereby snapping the jaws 22 and 23 to a closed position as the apertured portions 16 and 17 ride upwardly over the shank portions 25 and 26 of the jaws 22 and 23. The jaws 22 and 23 will be held firmly in a closed position until the actuating plate 14 is depressed by an operator to remove the animal from between the closed jaws.

The trap again may be reset by actuating the crank 31 to depress the plate 14 and to cause the trigger pin 38 to automatically engage the post 35 and hold the trap in a set position.

As shown in Figures 1 to 4 inclusive, the jaws 22 and 23 are of duplicate construction, that is, the jaw 23 is constructed the same as the jaw 22, which jaw 22 is herein described. The jaw 22 is provided with outwardly flared side bars 43 having inwardly extending teeth 44 which are matched by similar teeth carried by the jaw 23. The jaw 22 is provided with an outer arched flange 45 at its outer end and this flange 45 is provided with teeth 46 along its inner edge, which teeth are matched by similar teeth formed upon the abutting edge of the companion jaw 23. The teeth of the jaws may be of varying design without departing from the spirit of the invention. An arc-shaped flange 47 is inset relative to the flange 45 and is provided with teeth 48 which teeth are matched by similar teeth carried by a similar flange carried by the companion jaw 23.

Having described the invention, what I claim as new is:

1. A trap of the class described comprising a base, an actuating plate carried thereby, a trigger post carried by said base and extending through said actuating plate, a longitudinally movable trigger pin yieldably mounted upon said actuating plate and normally engaging said trigger post to hold the actuating plate in a set position, means carried by said trigger pin to connect a bait thereto in a manner whereby a pull upon the bait will move the pin longitudinally to disconnect the trigger pin from the trigger post, jaws hinged to the base, means carried by the actuating plate and engaging the jaws for swinging said jaws to a closed position when the actuating plate is moved outwardly relative to the base, and means carried by said base and engaging the actuating plate to automatically move the actuating plate outwardly of the base when the trigger pin is released from the trigger post.

2. A trap of the class described comprising a base, an actuating plate carried thereby, a trigger post carried by said base and extending through said actuating plate, a longitudinally movable trigger pin yieldably mounted upon said actuating plate and normally engaging said trigger post to hold the actuating plate in a set position, means carried by said trigger pin to connect a bait thereto in a manner whereby a pull upon the bait will move the pin longitudinally to disconnect the trigger pin from the trigger post, jaws hinged to the base, means carried by the actuating plate and engaging the jaws for swinging said jaws to a closed position when the actuating plate is moved outwardly relative to the base, means carried by said base and engaging the actuating plate to automatically move the actuating plate outwardly of the base when the trigger pin is released from the trigger post, said jaws flaring outwardly and having an outer row of inwardly facing teeth, a second row of inwardly facing teeth spaced inwardly of the outer teeth, and each jaw having side bars provided with inwardly extending teeth.

JOSEPH DAVIS PIRTLE.

REFERENCES CITED

The following references are of record in the file of this patent:

UNITED STATES PATENTS

| Number | Name | Date |
|---|---|---|
| 419,587 | Jameson | Jan. 14, 1890 |
| 1,017,605 | Tilley | Feb. 13, 1912 |
| 1,365,478 | Genett | Jan. 11, 1921 |
| 1,442,450 | Schneider | Jan. 16, 1923 |
| 1,865,044 | Polaire | June 28, 1932 |
| 2,254,825 | Middleton | Sept. 2, 1941 |